April 8, 1930.  M. ZADOROZNY  1,753,766
SHEET GLASS APPARATUS
Filed Feb. 1, 1928
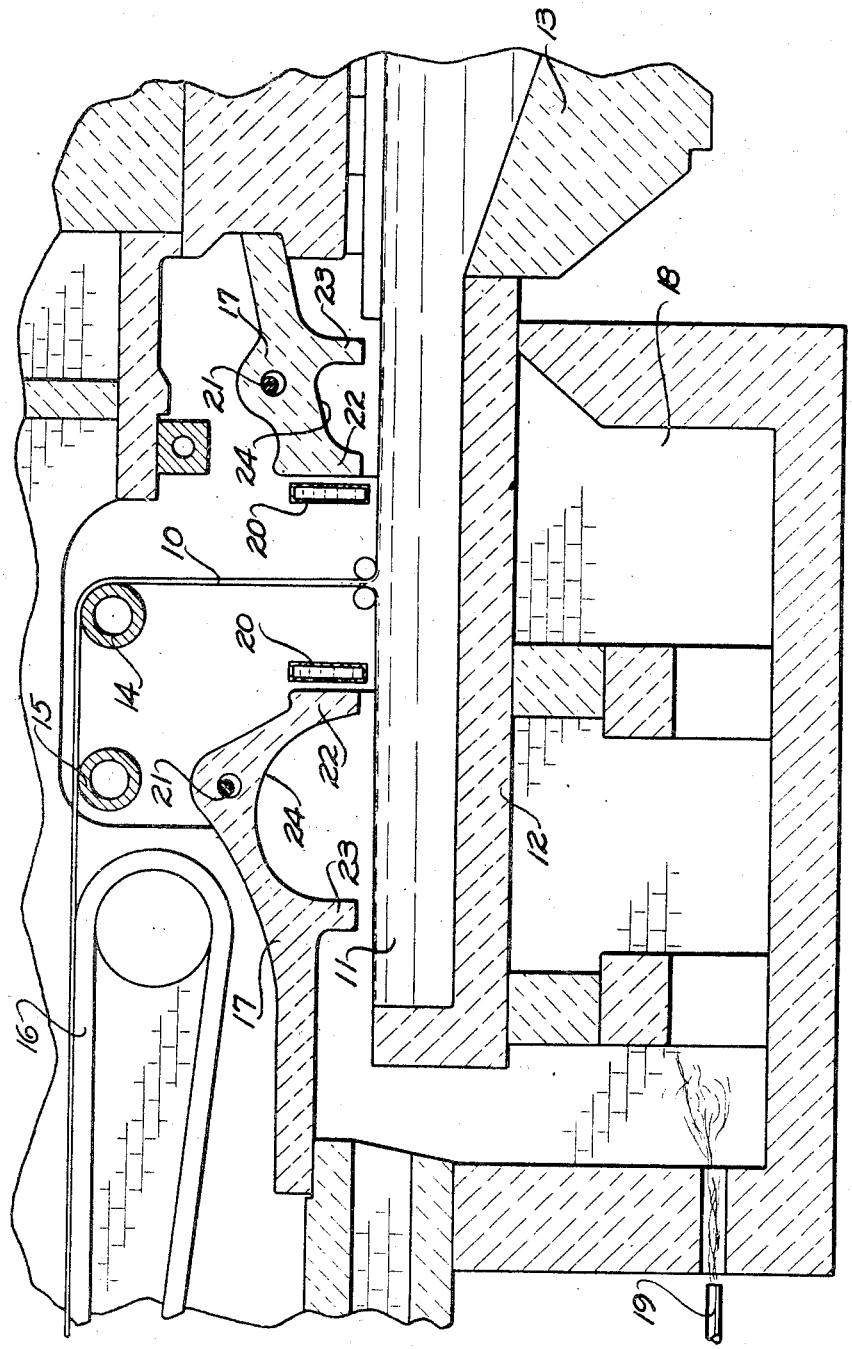
Inventor
Mike Zadorozny
By Frank Fraser
Attorney Patented Apr. 8, 1930

1,753,766

UNITED STATES PATENT OFFICE

MIKE ZADOROZNY, OF CHARLESTON, WEST VIRGINIA, ASSIGNOR TO LIBBEY-OWENS GLASS COMPANY, OF TOLEDO, OHIO, A CORPORATION OF OHIO

SHEET-GLASS APPARATUS

Application filed February 1, 1928. Serial No. 251,071.

The present invention relates to sheet glass apparatus generally but has particular reference to an improved lip tile construction.

An important object of the invention is to provide in sheet glass apparatus, a lip tile formed with a plurality of lips to thereby more effectively protect the sheet from the heat currents and radiated heat.

Still another object of the invention is to provide in sheet glass apparatus a lip tile provided with means for trapping and localizing heat thereunder whereby to more effectually maintain the molten glass in the draw pot at the proper temperature.

Still another object of the invention is to provide in sheet glass apparatus a draw pot containing a mass of molten glass, and a lip tile arranged over the molten glass, said lip tile being formed with a pair of spaced lips and being shaped to provide a recess or chamber therebetween; the pair of lips affording multiple means for protecting the sheet in its vertical run from heat currents and radiated heat and the recess or chamber providing means for trapping and localizing heat whereby the molten glass in the draw pot may be more readily maintained at the proper temperature.

Many other objects, advantages and novel details of construction of the present invention will be made more apparent as this description proceeds, especially when considered in connection with the accompanying drawing, wherein there is illustrated a fragmentary vertical sectional view of a form of sheet glass drawing apparatus illustrating the present invention in use.

The present invention relates and finds particular utility in connection with the Colburn machine, although it is not necessarily limited to use exclusively with this type of apparatus.

In the Colburn machine as set forth in Patent 1,248,809, a sheet of glass 10 is continuously drawn from a mass of molten glass 11 contained in a draw pot 12, arranged in open communication and supplied with molten glass from a tank furnace 13. The sheet 10 is drawn initially in a vertical plane after which it is bent over a so-called bending roll 14 whereby the sheet may be run in a horizontal plane over an idler roll 15, a draw table 16 and thence through an annealing lehr which is not shown.

In the Colburn machine there are also employed lip tiles 17 to protect the sheet 10 in its vertical run from heat currents and radiated heat which would otherwise strike the sheet. These lip tiles are also shaped to deflect heat and gases downwardly upon the surface of the molten glass. The heat currents or rays come from the tank furnace 13 on the one side of the sheet and from below the pot 14 upwardly around the front end thereof on the other side of the sheet.

The draw pot 12 is heated within a suitable heating chamber 18 preferably by means of burners 19 and in addition to heating the contents of the pot through the walls thereof, heat is supplied which passes up around the front end of the pot and into engagement with the top surface of the molten glass to maintain the same in a plastic workable condition. Heat absorbing shields 20 co-operate with the lip tiles 17 to assist in shielding the sheet of glass 10 from the said heat and gases. The lip tiles 17 may be supported above the molten glass by means of rods 21 passing through longitudinally extending openings formed therein.

It has been generally customary heretofore to provide each lip tile with but a single lip which, with the co-operation of the associated heat absorbing shield acted to protect the sheet 10 in its vertical run from the heat currents. Lip tiles heretofore have also been shaped to deflect heat and gases downwardly upon the surface of the molten glass for the purpose of maintaining the same at the desired or required temperature. However, it has frequently been found that lip tiles constructed in accordance with what is now the general practice have not been effective under all conditions to protect the sheet from the heat currents nor to effectively direct the heat to properly control the temperature of the molten glass in the draw pot. It is therefore the purpose and primary object of this invention to provide an improved construction of lip tile wherein multiple means are provided for protecting the sheet from the heat currents together with means for trapping heat and localizing the same adjacent the surface of the molten glass so that heat currents of more intensity or greater volume may be supplied without raising the temperature of the sheet sufficiently to interfere with the proper and efficient drawing or formation thereof.

To this end I propose providing each lip tile with a plurality, here shown as two, lips 22 and 23, with one of the lips located adjacent to and co-operating with the heat absorbing shield and the other lip 23 spaced therefrom and arranged closer to the source or origin of the heat currents. By means of such a construction the heat currents flowing towards the sheet 10 in its vertical run and originating either in the tank furnace or in the pot chamber must first pass the respective lip 23 and then the respective lip 22 and heat absorbing shield 20 before coming in contact with the sheet 10 being drawn.

Each lip tile 17 is further formed, in the space between the spaced lips 22 and 23, with a recess or chamber 24 extending upwardly from the surface of the molten glass 11. Each chamber or recess 24 has its open side arranged adjacent to the surface of the molten glass and these chambers are adapted to trap or arrest the heat currents and gases flowing under the lip tiles and thus accumulate the same to provide localized sources of heat which will effectually act to advantage on the molten glass 11. Thus with this construction of lip tile, sources of heat may be maintained in a localized condition immediately above the surface of the molten glass and in position so that the same acts thereon to maintain the molten glass in the proper temperature and in a workable plastic condition. Furthermore by providing these chambers for receiving the heat currents and gases, a considerable amount of this heat and gas which might otherwise pass the lip tiles 21 and thus act upon the sheet 10 is intercepted or arrested by these chambers. With the herein described construction it is possible to more effectively control the temperature of the molten glass in the draw pot whereby a continuous sheet of glass may be more efficiently produced and the sheet substantially completely protected from the action of heat currents and radiated heat.

While an embodiment of the invention has been illustrated and described herein somewhat in detail it will be readily apparent to those skilled in this art that various changes, modifications and rearrangements may be made without departing from the spirit and scope of the invention and to this end reservation is made to make such changes as may come within the purview of the accompanying claims.

I claim:

1. In sheet glass apparatus, a lip tile comprising a body portion, a downwardly extending lip portion at one end thereof, the tile being supported at its other end, and a second lip portion also carried by said body portion and being in spaced relation to the first lip portion.

2. In sheet glass apparatus, a lip tile comprising a body portion, a downwardly extending lip portion at one end thereof, the tile being supported at its other end, and a second lip portion also carried by said body portion and being in spaced relation to the first lip portion, said lip portions being shaped to provide a heat trapping chamber adapted to create a localized source of heat.

3. In sheet glass apparatus, a lip tile comprising a substantially horizontally disposed body portion, a downwardly extending lip portion formed at one end, the tile being supported at the opposite end, and a second downwardly extending lip portion carried by said body and being in spaced relation to the first lip portion to create a chamber for trapping and localizing heat therebetween, the lower ends of said lip portions terminating substantially in the same horizontal plane.

4. In sheet glass apparatus, a receptacle containing a mass of molten glass, means for drawing a sheet therefrom, and a lip tile arranged on each side of said sheet, each lip tile comprising a body portion suspended over said molten glass and being supported at one end, a downwardly extending lip portion carried by the opposite end of the body, and a second downwardly extending lip portion arranged between the ends of said body portion, said lip portions creating a chamber for trapping and localizing heat adjacent the surface of the molten glass.

Signed at Charleston, in the county of Kanawha and State of West Virginia, this twenty-fourth day of January, 1928.

MIKE ZADOROZNY.